United States Patent
Legtenberg et al.

(10) Patent No.: US 7,690,402 B2
(45) Date of Patent: Apr. 6, 2010

(54) METHOD, AN IMPLEMENT AND A TWISTER FOR TYING TOGETHER END PORTIONS OF WIRE MATERIAL EXTENDING AROUND A BALE

(75) Inventors: Hermannus Johannes Maria Legtenberg, Winschoten (NL); Klaas Smit, Steendam (NL)

(73) Assignee: Machinefabriek Bollegraaf Appingedam B.V., Appingedam (NL)

( * ) Notice: Subject to any disclaimer, the term of this patent is extended or adjusted under 35 U.S.C. 154(b) by 12 days.

(21) Appl. No.: 11/594,538

(22) Filed: Nov. 8, 2006

(65) Prior Publication Data

US 2007/0089617 A1 Apr. 26, 2007

Related U.S. Application Data

(60) Provisional application No. 60/737,285, filed on Nov. 16, 2005.

(30) Foreign Application Priority Data

Sep. 11, 2005 (EP) ................... 05077551

(51) Int. Cl.
| | |
|---|---|
| B21F 45/00 | (2006.01) |
| B21F 7/00 | (2006.01) |
| B21F 15/04 | (2006.01) |
| B65B 13/02 | (2006.01) |
| B65B 13/28 | (2006.01) |

(52) U.S. Cl. .................. 140/93.6; 72/118; 72/149; 100/2; 100/31
(58) Field of Classification Search ........... 140/30, 140/36, 39, 93.6, 118, 149, 102, 119; 100/31, 100/5

See application file for complete search history.

(56) References Cited

U.S. PATENT DOCUMENTS

| | | | |
|---|---|---|---|
| 2,251,873 | A | 8/1941 | Gibbs |
| 3,667,377 | A | 6/1972 | Persson |
| 4,167,902 | A | 9/1979 | Bister et al. |

(Continued)

FOREIGN PATENT DOCUMENTS

DE 2460464 6/1976

(Continued)

*Primary Examiner*—Dana Ross
*Assistant Examiner*—Teresa M Bonk
(74) *Attorney, Agent, or Firm*—Pearne & Gordon LLP

(57) ABSTRACT

For tying wire material around a bale, a pair of end portions of the loop is held in a substantially mutually parallel orientation. An engaged section of at least one of the end portions is moved about a longitudinal axis of the other end portion of that pair, such that the pair of end portions is twisted into a wire twist between an engagement area and a portion of the loop extending about the bale. During twisting, wire material of at least one of the end portions slips through the engagement area towards the portion of the loop extending about the bale. An implement and twisters for use in such a method are also described.

9 Claims, 11 Drawing Sheets

U.S. PATENT DOCUMENTS

| | | | |
|---|---|---|---|
| 4,459,904 A * | 7/1984 | Probst et al. | 100/11 |
| 4,732,180 A | 3/1988 | Fixel | |
| 5,870,950 A * | 2/1999 | Wiedel | 100/33 R |
| 6,032,575 A | 3/2000 | Johnson | |
| 6,199,475 B1 | 3/2001 | Schwelling | |
| 2004/0054441 A1 * | 3/2004 | Stamps et al. | 700/275 |
| 2004/0148920 A1 | 8/2004 | Drost | |

FOREIGN PATENT DOCUMENTS

| | | |
|---|---|---|
| DE | 4203360 A1 | 8/1993 |
| DE | 10021471 | 11/2000 |
| EP | 0235378 A2 | 9/1987 |
| EP | 0808771 A1 | 11/1997 |
| GB | 1179342 | 1/1970 |
| WO | 02079035 A1 | 10/2002 |

* cited by examiner

METHOD, AN IMPLEMENT AND A TWISTER FOR TYING TOGETHER END PORTIONS OF WIRE MATERIAL EXTENDING AROUND A BALE

CROSS-REFERENCE TO RELATED APPLICATION

This application claims the benefit of U.S. Provisional Patent Application Ser. No. 60/737,285 filed Nov. 16, 2005, the contents of which are incorporated herein by reference.

TECHNICAL FIELD AND BACKGROUND ART

The present invention relates to a method, an implement and a twister for tying together end portions of wire material extending around a bale.

To facilitate storage, handling and transportation of loose material, such as waste paper and cardboard, waste plastic, straw, it is usual to press the material into bales.

To prepare the bales, the material is pressed in a baling press. A baling press typically includes a baling channel in which a pressing ram is reciprocally movable to and fro, new material to be baled being added each time after the press has been retracted. The counter pressure against which the bales are pressed is obtained by resistance encountered by the material as it is pressed through the pressing channel, which, to that end, has a cross-section that decreases in downstream direction over at least a portion of its length. Initial counter pressure may be obtained by mounting obstacles in the pressing channel.

For facilitating separation of the pressed material into distinct bales and for keeping the bales together, wire material is usually tied around the bales. The wire material is usually steel wire and a loop of wire material extending around the bale is usually obtained by providing that wire material from two sources and extending along opposite sides of the bale to be formed is tied together near the downstream end of the bale to be formed and is tied together near the upstream end of the bale after the material for forming that bale has been pressed.

The tying together is usually accomplished by twisting or twining end sections of the wire material from a mutually parallel configuration.

An example of a mechanism for tying of bales is for instance described in U.S. Pat. No. 3,667,377. In this mechanism, twisters for twisting the wires are provided in the form of twisting hooks supported by a twister frame that is guided for movement vertically (i.e. towards and away from the bale) by means of hydraulic rams.

Also according to European patent application 0 808 771, twisters in the form of twist hooks are used. In this twisting mechanism separate twisters twist the wires in two engagement areas on a bale and, respectively press ram side of a needle for lifting the wires and a cutter. The twister on the press ram side of the needle engages the wires slightly later than the twister on the bale side. It is said that, in spite of the possibility of the wire to slide over the twister on the ram side, this is advantageous as it leads to shorter twisted ends, without causing the wires to be loaded dangerously prior to cutting.

U.S. Pat. No. 6,199,475 discloses twisters in the form of slotted twisting disks enclosed between plates. U.S. Pat. No. 6,032,575 discloses twisters in the form of twister pinions rotatably mounted in blocks.

Although steel wire may be tied reliably by twisting, its separation from the baled material during or after processing and even after incineration of the material is cumbersome and it can easily become entangled in processing apparatus from which it is difficult to remove. Such drawbacks would to a large extent be avoided if, instead, the bales would be tied with plastic wire, which burns up if it is incinerated and is otherwise more easily cuttable and choppable and exhibits less tendency to become entangled.

Other disadvantages of steel wire are that the twisted sections of the wire material are relatively weak compared with the strength of non twisted sections and that remainders of the material and rust forms a hazard where wire is used to bale animal feed. Where the wire is used to bale waste paper, steel material originating from the wire used to keep the bales together constitutes a separate category of waste material in the paper industry.

Plastic wire has been proposed and its use would, at least to a large extent, overcome these problems. However, plastic wire allows a much larger elastic deformation, before it is deformed plastically and therefore exhibits much more tendency to spring back and thereby untwist after twisting than steel wire. Accordingly, it is has been found difficult to connect wires of plastic material by twisting.

In International patent application WO 02/079035, it is described that untwisting and breakage of a twist of plastic threads may be avoided by reducing the distance between the position where the threads are held and the ends of the thread. To that end, the twisters are suspended in a frame that is lowered in vertical direction while the twisters continue to rotate after cutting, while the needle are lowered over twice the distance over which the frame is lowered. This, however, requires a complicated construction.

SUMMARY OF THE INVENTION

It is an object of the invention, to provide a solution that allows reliable interconnection of wires of plastic material by twisting, without requiring a complicated mechanism.

According to the invention, this object is achieved by providing a method for tying wire material around a bale, including:

arranging a loop of wire material around a bale, holding a pair of end portions of the loop in a substantially mutually parallel orientation;

engaging the pair of end portions in an engagement area near the bale and moving an engaged section of at least one of the end portions about a longitudinal axis of the other end portion of that pair, such that the pair of end portions is twisted into a wire twist between the engagement area and a portion of the loop extending about the bale; and during twisting, allowing wire material of at least one of the end portions to slip through the engagement area towards the portion of the loop extending about the bale.

The invention may also be embodied in an implement for tying wire material around a bale, comprising:

a wire guide arrangement for arranging a loop of wire material around a bale and for holding a pair of end portions of the loop in a substantially mutually parallel orientation;

at least one twister for engaging at least one of the pair of end portions near the bale and moving an engaged section of the at least one of the end portions about a longitudinal axis of the other section of that pair, such that the pair of end portions is twisted into a wire twist between the twister and a portion of the loop extending about the bale; and the twister being adapted for allowing, during twisting, wire material of at least one of the end portions to slip through the twister towards the portion of the loop extending about the bale.

Yet another embodiment of the invention is a twisters having a wire engagement body for engaging at least one of a pair of parallel wire portions and moving an engaged section of the at least one of the wire portions about a longitudinal axis of the other of the pair of wire portions such that the pair of wire portions is twisted into a wire twist; wherein the twister includes a wire engagement passage for receiving at least one of the wire portions to be twisted, the wire engagement passage having at least one surface having a friction coefficient to plastic wire of less than 0.5 or has at least one plastic surface. Such a twister is specifically adapted for use in such an implement according to the invention.

Particular elaborations and embodiments of the invention are set forth in the dependent claims.

Further features, effects and details of the invention appear from the detailed description and the drawings.

MODES FOR CARRYING OUT THE INVENTION

Figure 1:
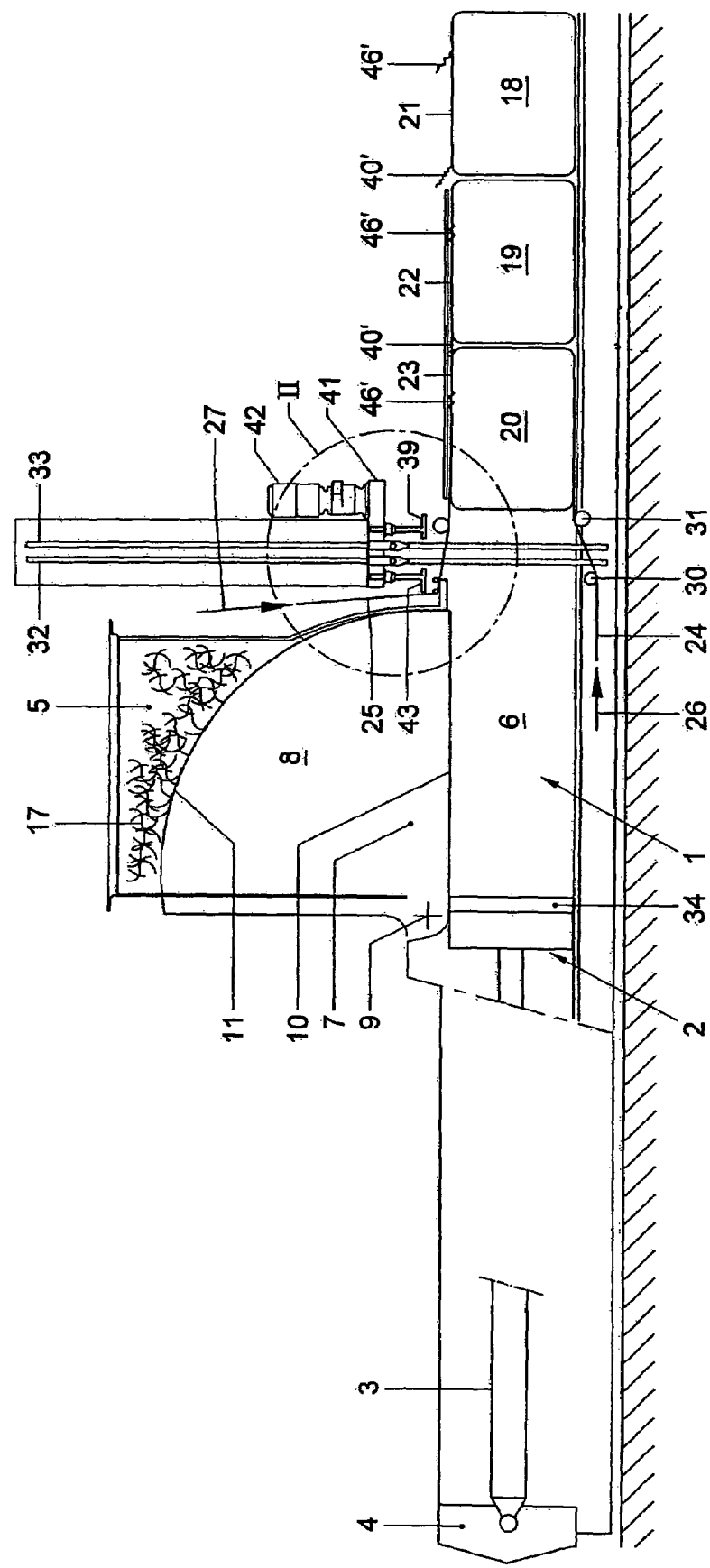
FIG. 1 is a schematic, partially cut-away side view of a baling press equipped with an example of a wire-tying implement according to the invention.

The baling press shown in FIG. 1 has a pressing channel 1 in which a ram 2 is displaceable by a piston 3 mounted between the ram 2 and a suspension bracket 4. The ram 2 is shown in its most retracted position. A feed chute 5 communicates with a pressing chamber area 6 of the pressing channel 1 via a passage 7 forming a downstream end of the feed chute 5.

A prepress valve 8 is pivotable about a pivotal axis 9 and has a flat wall 10 which, in closed position, closes off the passage from the feed chute 5 to the pressing channel 1 and, in opened position, is disposed in a wall of the feed chute 5. The prepress valve 8 furthermore has a surface 11 substantially curved around the pivotal axis 9, which surface in closed position bounds the feed chute 5 in axial direction.

Material 17 to be pressed may already be deposited into the feed chute 5, while the prepress valve 8 is closed. When the prepress valve 8 is opened, material to be pressed partially drops into the pressing chamber 6 and partially forms a pile aside the prepress valve 8. When the prepress valve 8 is closed again a volume of the material is precompressed in the pressing chamber 6 by the closing prepress valve 8 and can be compressed to form a bale by the pressing ram 2 moving to its most forward position (FIGS. 2A-2D) while simultaneously new material to be pressed can be deposited into the feed chute 5.

Counter pressure in the pressing channel 1 against which a bale is pressed in the pressing chamber 6 and pushed out of the pressing chamber 6 is obtained by resistance encountered by the material of previously compressed material formed into bales 18, 19, 20 as it is pressed through the pressing channel 1. To that end, the pressing channel 1 has a cross-section that decreases in downstream direction over at least a portion of its length. Initial counter pressure may be obtained by mounting obstacles in the pressing channel 1.

For facilitating separation of compressed material into discrete bales and for facilitating manipulation, transport and for preventing bales from falling apart, the loops 21-23 of wire are tied around each bale 18-20. Each bale may be obtained by a single or a plurality of compression cycles of the pressing ram 2 each time compressing material newly fed into the pressing chamber 6.

For tying loops of wire material around the bales, a plurality (in this example four) lower wires 24 are fed under pressing channel 1 from spools in a direction 26. From above, the same number of wires 25 is fed from another spool in a direction 27. Before a bale is formed and pushed out of the pressing chamber, each first wire 24 fed from below has been connected by means of a twist 46' to an upper wire 26 fed from above during the tying of a previous bale (see FIG. 2D).

Figure 2A:
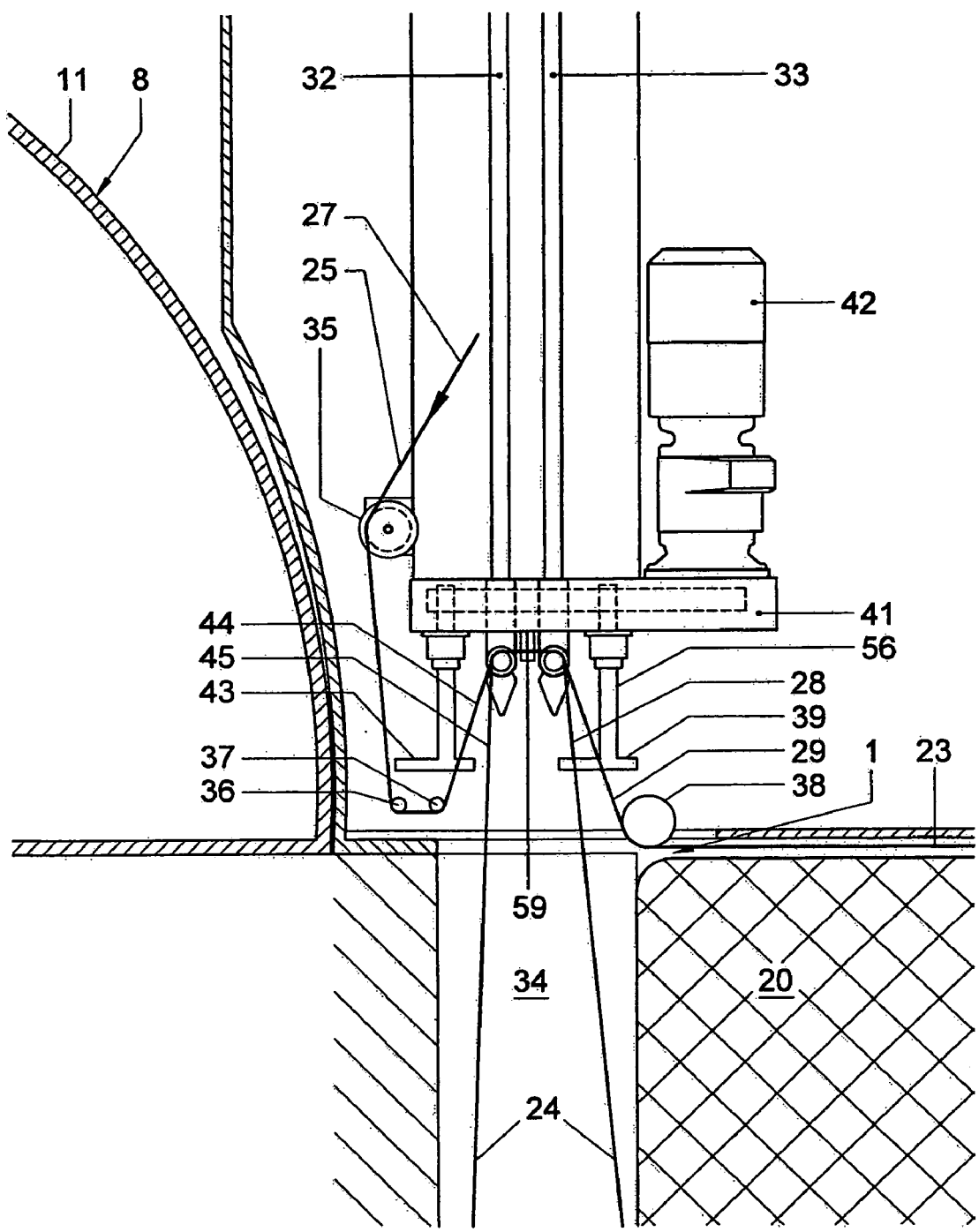
FIGS. 2A-2D are schematic, partially cut-away side views during successive stages of operation of a portion of the baling press shown in FIG. 1.

The implement for tying wire material around a bale includes a wire guide arrangement for arranging a loop 21-23 of wire material 24, 25 around a bale and for holding a pair of end portions 28, 29 (see FIG. 2A) of the loop 23 next to each other. According to the present example, the wire guide arrangement includes lower guide rollers 30, 31 located closely along the bottom of the pressing channel 1, for guiding lower wires 24 fed from respective spools into the pressing channel 1 and wire catchers 32, 33 for pulling up lower wires 24 from adjacent the bottom of the baling channel 1. An example of such a catcher is described in more detail in applicants' U.S. Pat. No. 5,255,597. The wire catchers 32, 33 are movable between a lowermost position as indicated by dash and dot lines in FIG. 1 and an uppermost position as shown in full lines in FIG. 1 and as shown in FIGS. 2A-2D. Each time after a bale is pushed out of the pressing chamber 6, the catchers 32, 33 are lowered via slots 34 in the pressing ram 3, catch the lower wires 24 that extend closely along the bottom of the pressing channel and pull the wires 24 up to form a temporary loop projecting until above the pressing channel 1. During upward movement, the catchers 32, 33 also entrain the upper wires 25 into temporary loops so that the temporary loops of upper and lower wire material 24, 25 commonly extend along the catchers 32, 33 as is shown in FIG. 2A.

The wire guide arrangement furthermore includes upper guide rollers 35, 36, 37, 38 at the top side end of the pressing channel 1, for guiding upper wires 25 fed from respective spools into the pressing channel 1 and to the area where the temporary loops are formed.

The implement for tying wire material around a bale, furthermore includes twisters 39 for engaging the pairs of end portions 28, 29 near the bale and moving an engaged section of at least one of each of the pairs of end portions 28, 29 about a longitudinal axis of the other such that the pairs of end portions 28, 29 are twisted into wire twists 40, 40' (see FIGS. 1, 2C and 2D) between the twisters 39 and the respective portions of the loops 23 extending about the bale 20.

Figure 3:
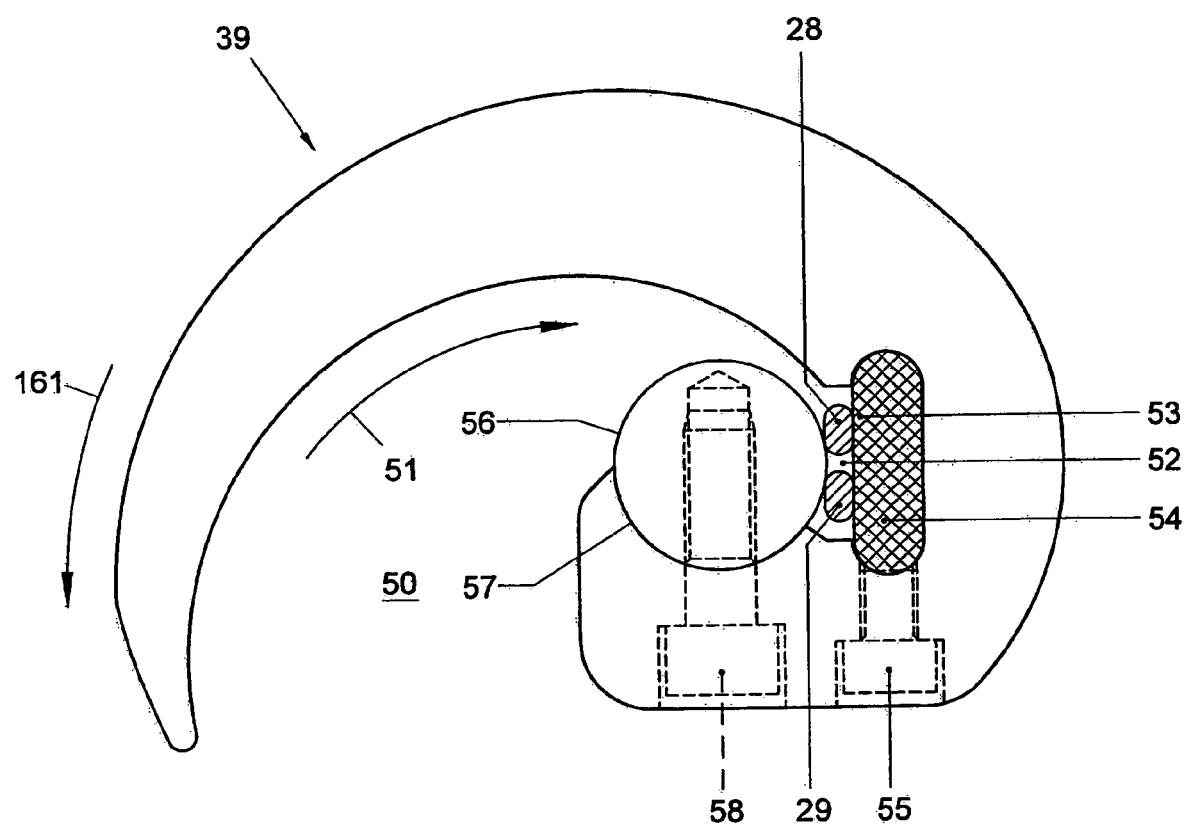
FIG. 3 is a top plan view of an example of a twister according to the invention.

An example of a twister 39 is shown in more detail in FIG. 3. The twisters 39 according to the present example are each mounted to a stem 56 that is rotatably suspended in a twister carrier frame 41 and coupled to a motor 42 for driving rotation of the stems 56 and the twisters connected thereto.

The implement for tying wire material around a bale, furthermore include a second set of twisters 43 for engaging pairs of end portions 44, 45 of the wires 24, 25 extending to the twisters 43 from the respective supply spools and moving engaged sections of the end portions 44, 45 about longitudinal axes of the other section of each pair such that the end portions 44, 45 are also twisted into wire twists 46, 46' (see FIGS. 1, 2C and 2D) between the twisters 43 and more remote sections of the upper and lower wires 24, 25. These twists 46' (see also FIG. 1) interconnect the respective upper and lower wires 24, 25 such that when a new bale is pressed out of the pressing chamber 6, the upper and lower wires 24, 25 are pulled around the bale and form the downstream portion of the loops 23 around that bale.

The twisters 39 are adapted for allowing, during twisting, wire material 24, 25 of at least one of the end portions to slip through the twister towards the portion of the loop 23 extending about the bale 20. Slippage of the wire material through the engagement area, where it is engaged for twisting, towards the portion of the loop 23 extending about the bale 20, allows wire material to be fed during twisting to the twist 40, 40' that is being formed and reduces the longitudinal tension in the twist being formed. This in turn allows a more reliable twist to be obtained, in particular if the wire material that is to be twisted is plastic wire, such as PET monofilament, PP, PE or Aramide. Plastic wire is generally more difficult to twist to a reliable connection than steel wire, because plastic wire allows far larger elastic deformations than steel wire, before it is plastically deformed. This causes plastic wire to tend to spring back to its original shape more than steel wire. However, application of plastic wire for tying bales has many advantages over steel wire, such as the possibility to incinerate the wire material with the material of the bale, easier removability, less tendency to cause damage to processing equipment, less dangerous for animals if used for baling animal feed, no separate waste stream in addition to plastic waste if used for baling waste paper to be processed in the paper industry and the possibility to easily provide identification markings on the wire in the form of colour, shape or texture. Such markings may be machine readable. Preferably markings on the plastic wire are applied using a laser, which allows to apply markings very quickly and indelibly. The laser marker may for instance be positioned along the wire feed path of a baling press, so that markings can be applied just before the marked section of wire is tied to a bale. The markings may for instance represent data regarding the contents of the bales and regarding the date and place of baling.

Figure 4:
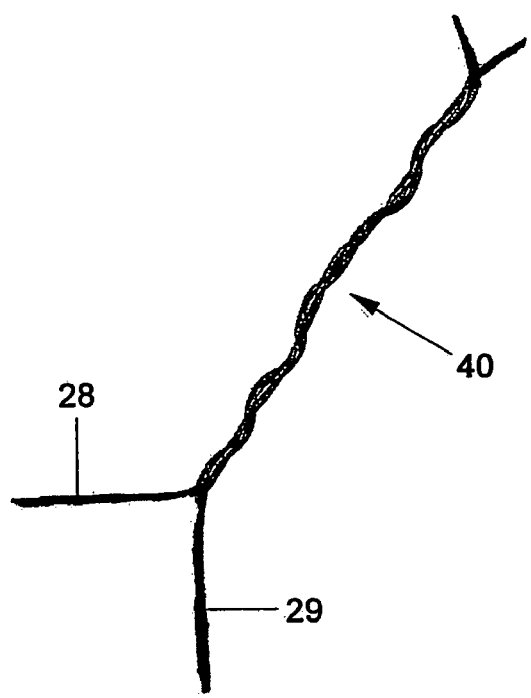
FIGS. 4 and 5 show successive stages of an example of a twisting operation according to the present invention.
Figure 5:
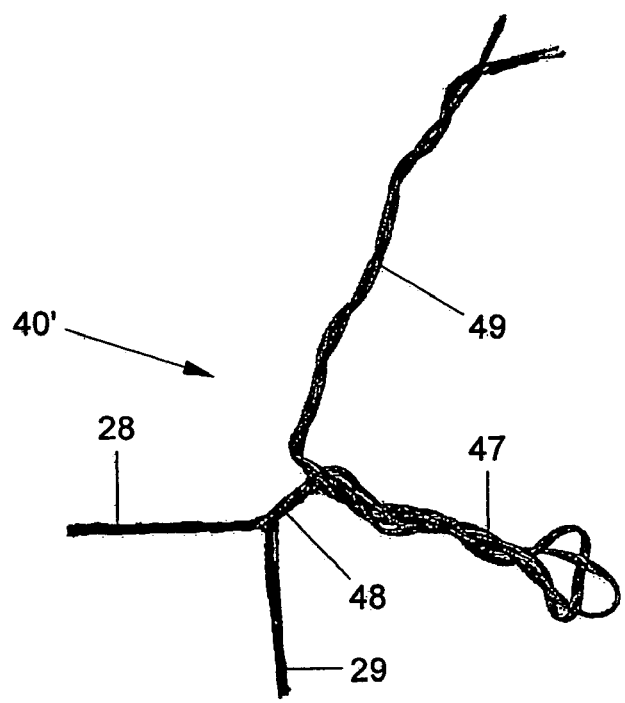

Preferably, the wire material slips through over such a distance that, starting from for example a situation as shown in FIG. 4, two sections of the twisted pairs of end portions 28, 29 form a twisted loop 47 in which the twisted sections 48, 49 of the pairs of end portions 29, 29 are twisted about each other, as is illustrated by the examples shown in FIG. 5. Such twists 40' exhibit a particularly good resistance against untwisting.

Similar considerations apply to the twisting of the ends of the wires 24, 25 extending to the twisters 43 from the respective supply spools into the twists 46'. The tension in the: upper and lower wires 24, 25 is preferably equal, to obtain a well balanced twist 46'.

The twister 39 according to the present example is a twist hook bounding an entry area 50 for catching wires to be twisted and guiding the wires generally in a direction 51 to a wire engagement passage 52 for receiving at least one of the wires 24, 25 to be twisted when the twister 139 is rotated in a sense of rotation 161 in which the open side of the twisting hook leads. According to the present example, the twisters 39 are arranged and dimensioned to catch two end portions 28, 29 to be twisted. That the twisters 39 each engage both end portions 28, 29 of the pair are engaged by that twister provides the advantage that it can easily be ensured that the twisting consist of similar helixes of wire material, which, in turn is advantageous for an effective mutual retention.

The wire engagement passage 52 forms a trailing dead end portion of the area enclosed by the twist hook 39. One surface 53 of the wire engagement passage 52 has a friction coefficient to plastic wire smaller than the friction coefficient of steel to that plastic wire and preferably less than 0.5 and preferably less than 0.3 to 0.2.

The low friction surface 53 of the twister 39 according to the present example has been obtained by providing that the wire engagement passage 52 has a surface of plastic material, preferably Nylon, HMPE or material produced on the basis of ultra-macromolecular, low-pressure polyethylene such as Material "S"®.

The plastic surface 53 is part of a plastic insert 54. This allows to provide a very thick layer of plastic material in a simple manner which, in turn, is advantageous because the risk of an increase of the friction coefficient due to the plastic material wearing through and an associated unreliable twisting action can easily be avoided. Another example of a plastic insert 53 is, that, as a relatively thick object, it also is resilient, so that it can give way slightly if very high pressure is exerted by the binding wire. Thus, the maximum friction resistance that the wire encounters in the engagement passage 52 during twisting is somewhat limited. The thickness of the insert is preferably at least 5 mm and more preferably at least 8 mm.

The plastic insert 54 is exchangeable, so that if the plastic material is worn, it is not necessary to replace the entire twisting hook 39. The insert is mounted in a correspondingly shaped bay and held in place by a clamp screw 55. It is observed that the plastic low friction surface may in principle be provided in many other ways as well, for instance by providing the hook as an injection molded plastic part, where necessary with a reinforcement insert.

As can also be seen in FIG. 3, the wire material has a cross-section having flat sides. The presence of at least one flat or concave side allows the twister 39 to also hold the wire against rotation relative to the twister about the central axis of the wire and therefore to more easily twist the wires about their respective central axes as the wires are twisted about each other. This results in better twistability.

The twister hook 39 has a mounting surface 57 clamped to the stem 56 by means of a clamp screw 58 engaging a threaded hole in the stem 56. This allows to easily mount and dismount twisting hooks 39 to respectively from the stems 56.

In use, the temporary loops of wire material 24, 25 caught by the catchers 32, 33 extend along a wire path from the twisters 39 for making the twists closely adjacent the bale to be tied to the twisters 43 for making the twists in end portions 44, 45 of wire materials 24, 25 connected to the respective supply spools, as is best seen in FIG. 2A. Along the wire path, cutters 59 are located for cutting loose the end portions 28 from the end portions 44 and the end portions 29 from the end portions 45.

Figure 2B:
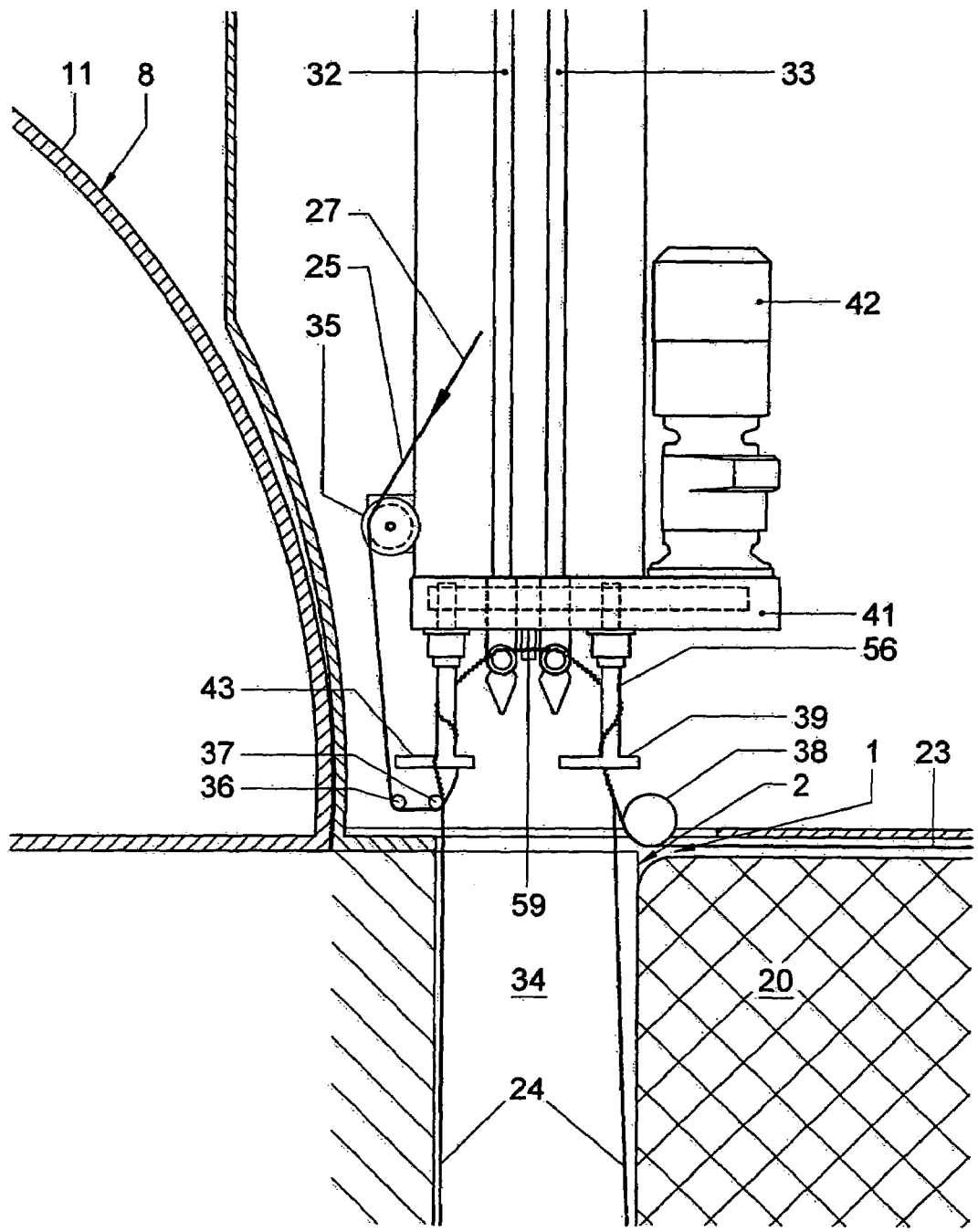

Preferably, the twisters 39, 43 are rotated, for instance over one or more full revolutions, causing the end portions 28, 29, respectively 44, 45 to be twisted together slightly, before the wires 24, 25 are cut (FIG. 2B). This ensures that the wires 24, 25 are engaged by the twisters 39, 43 and causes friction between the wires 24, 25 and the twisters 39, 43 to be increased to such an extent that the wires 24, 25 are reliably prevented from escaping from the twisters 39, 43 after cutting.

Figure 2C:
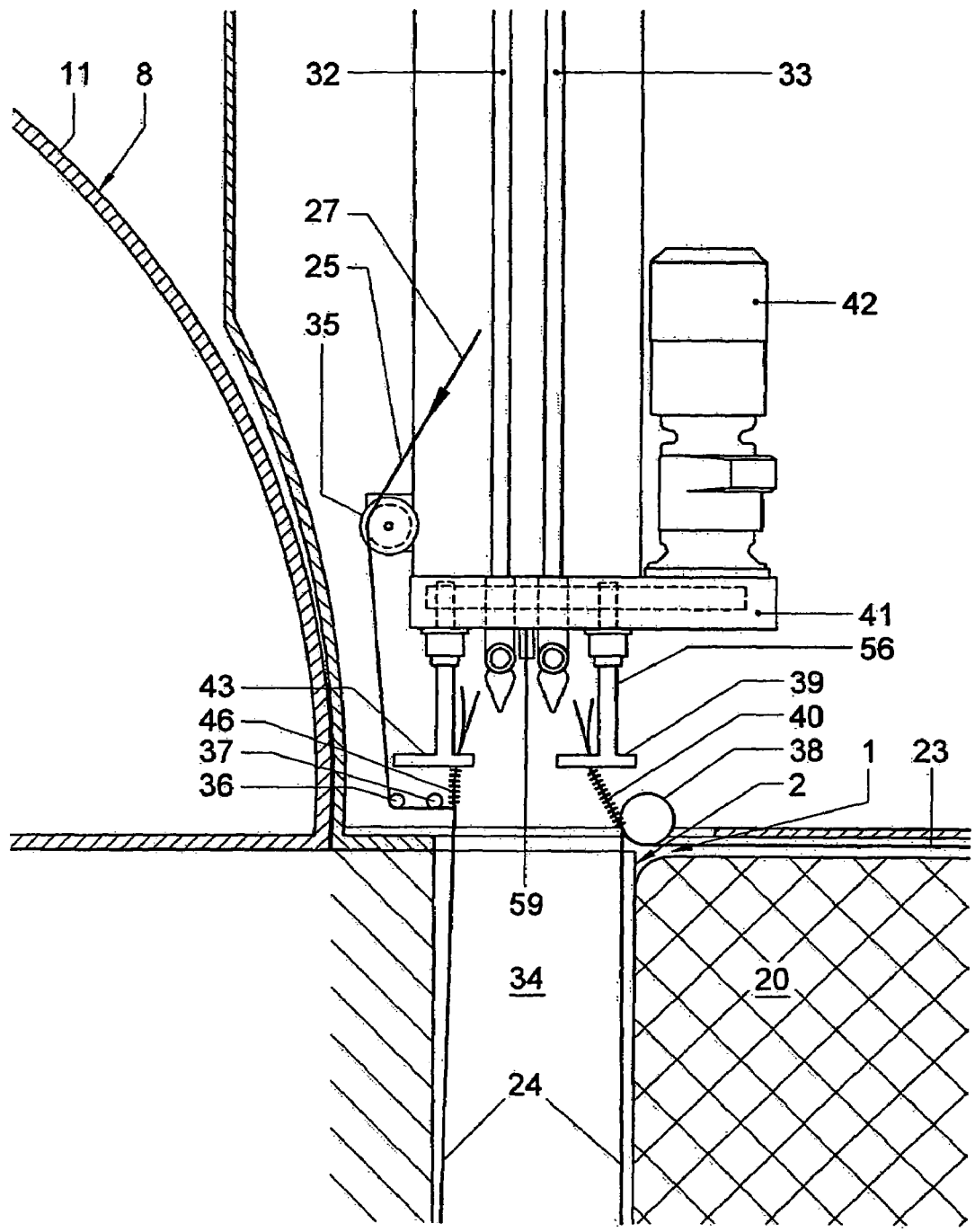
Figure 2D:
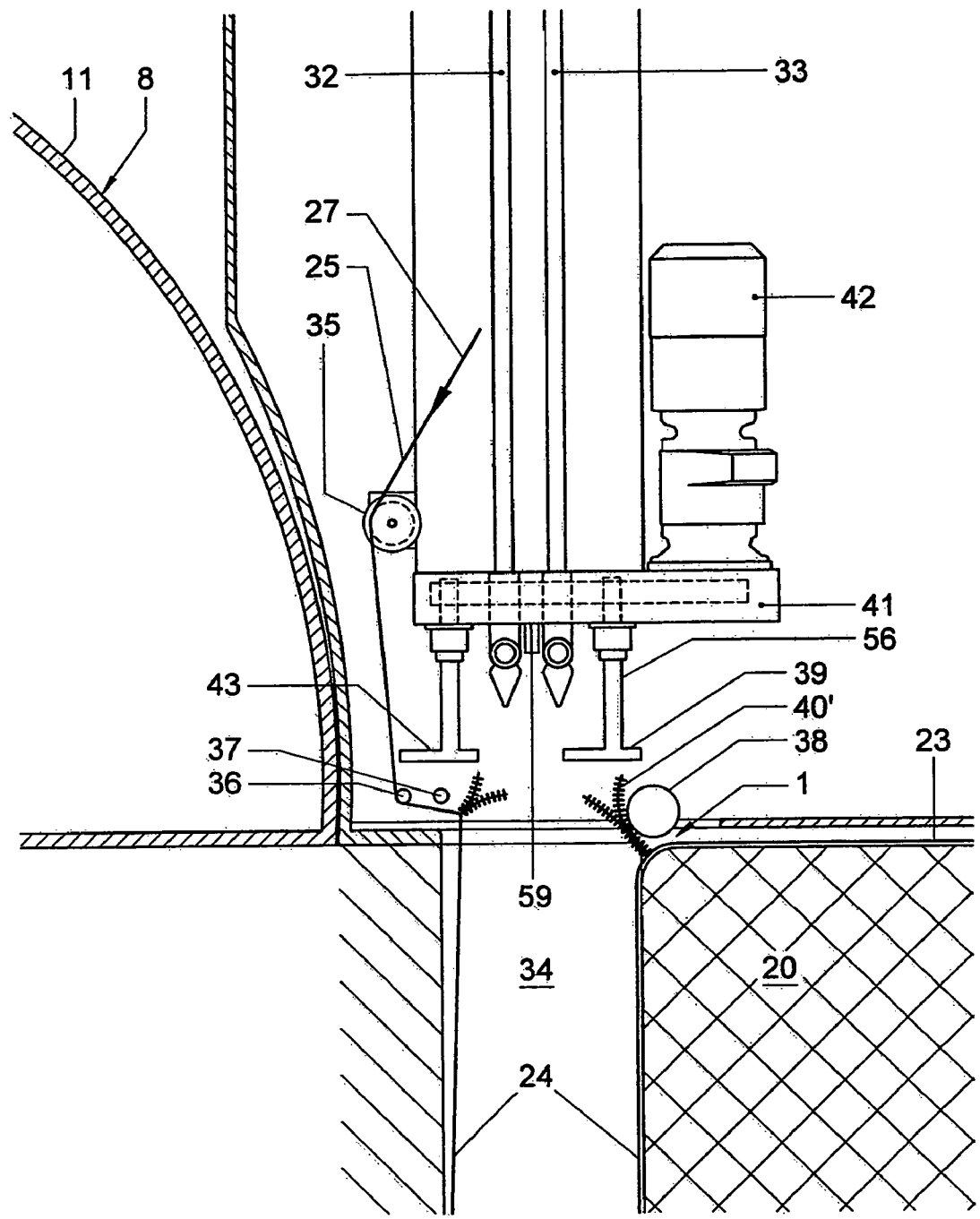

After cutting, the twisters are rotated further, for instance over 15-20 full revolutions, this initially causes the wires to be twisted further as illustrated in FIGS. 2C and 4. While twisting, the wires 24, 25 slip through the twisters 39, 43 away from the cutters. This allows relatively large lengths of wire to move to and be involved in the twisting and preferably, the amount of wire slipping through the twisters is such that double twists, in which twisted pairs of wires are twisted about each other, as for example shown in FIG. 5 are obtained. In such a double twist, twisted sections of the pair of wire material are in turn twisted about each other from a loop shaped end to an end where the twisted sections of the pairs of wire material diverge from each other. A double twist between a pair of wires results in a strongly enhanced strength and reliability of the connection obtained by the twisting.

According to the present example, the pairs of end portions 28, 29 and 44, 45 are engaged in the engagement area by twisters 39, 43, wherein the moving of the engaged sections of the end portions 28, 29 and 44, 45 about longitudinal axes of the other end portion 29, 28 and 45, 44 is carried out by rotating the twisters and the slipping occurs between the engaged end portions 28, 29 and 44, 45 and the twisters 39, 43. This is advantageous, because it may be realized with a relatively simple construction. It is, however, also conceivable that the twisting action is induced at a different location than the location along which the wires slip during twisting.

In FIGS. 6-9 an example of an application of the present invention in another baling press is shown. The baling press shown in FIG. 6 comprises a feed chute 105, which terminates in a pressing channel 101. The feed chute 105 is connected with the pressing channel 101 via a passage 107. Mounted at the end of the feed chute 105 on the side of the pressing channel 101 are a first and a second prepress valve 108 and 112. The prepress valves 108 and 112 are pivotable around axes 113 and 114, respectively, between a closed position (as shown) and an opened position. The prepress valves 108 and 112 are each provided with a surface 111 and 115, respectively, substantially curving with the respective pivotal axes 113, 114, as well as with flat walls 110, 116, which in closed position close off the passage 107 and in opened position form a part of the wall of the feed chute 105. In closed position the surfaces 110 and 116 close off the feed chute 105 in axial direction. Double prepress valves are described in more detail in applicants' U.S. Pat. No. 5,193,454. Instead of with prepress valves, the feed chute or channel may also be equipped with a prepress ram operating in longitudinal direction of the feed chute or channel.

Figure 6:
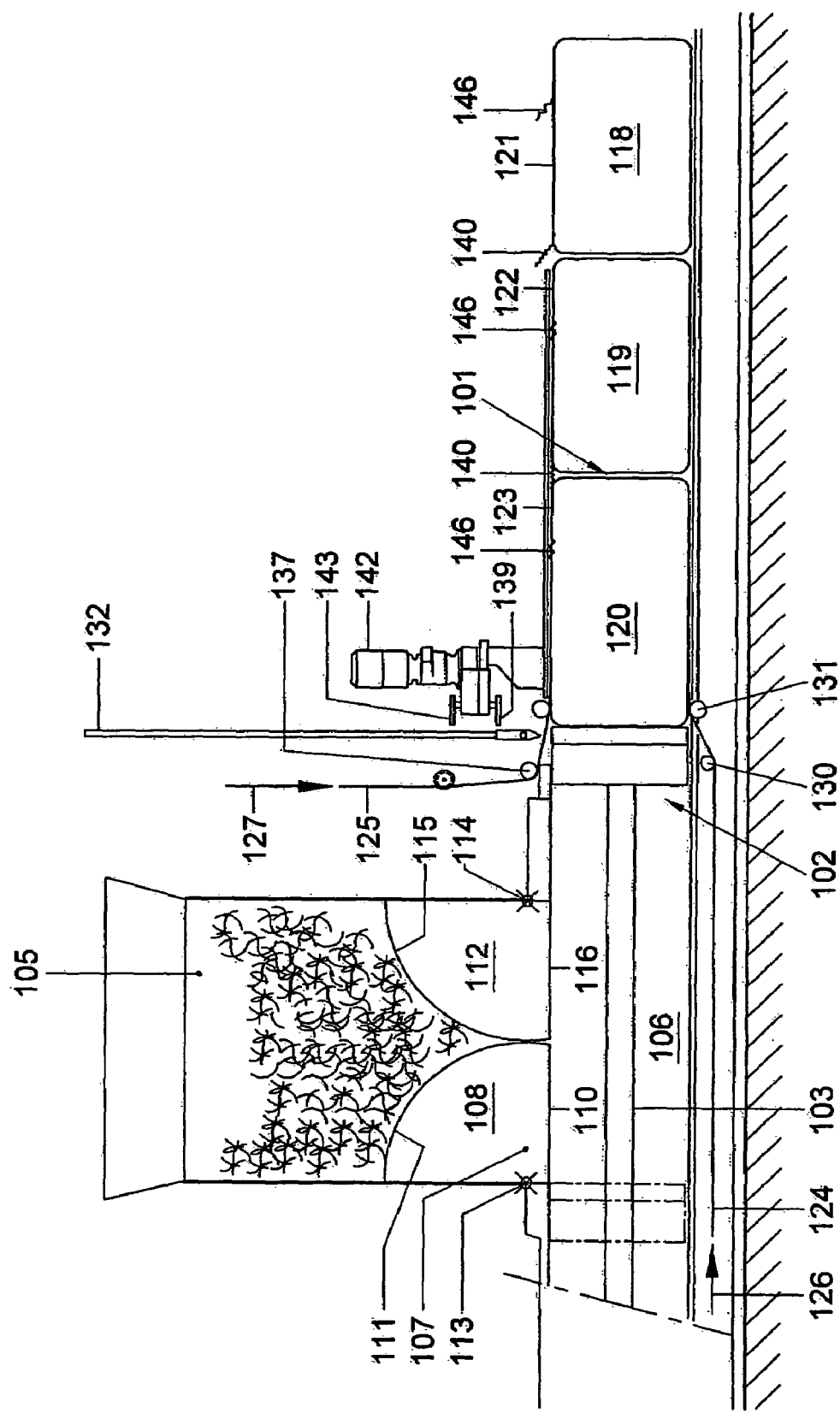
FIG. 6 is a schematic, partially cut-away side view of another baling press equipped with another example of a wire-tying implement according to the invention.
Figure 7B:
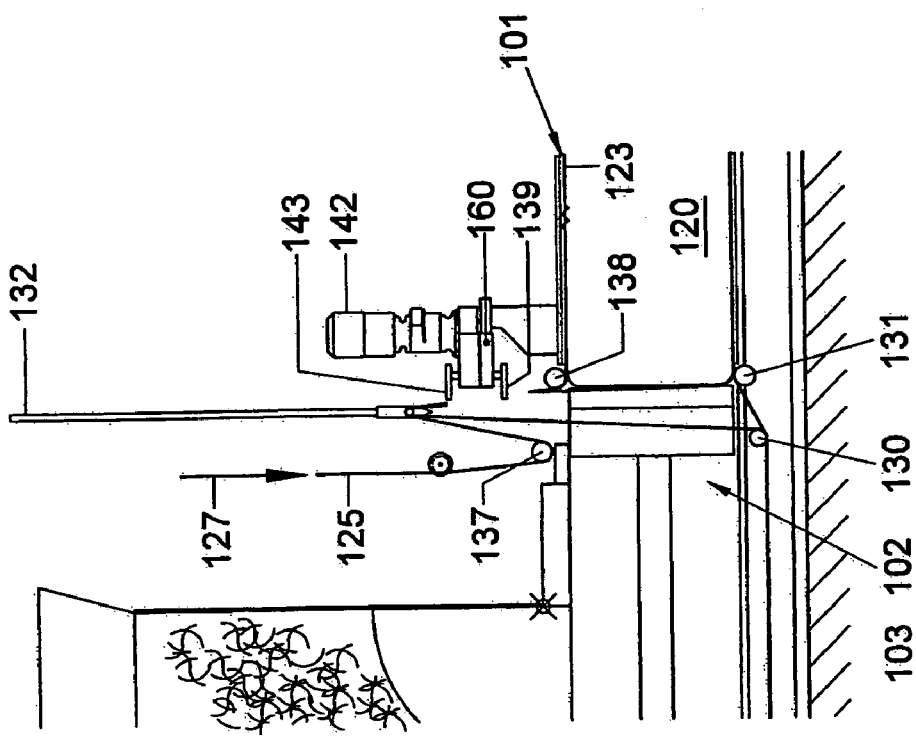
FIGS. 7A and 7B are schematic, partially cut-away side views during successive stages of operation of a portion of the baling press shown in FIG. 6.
Figure 7A:
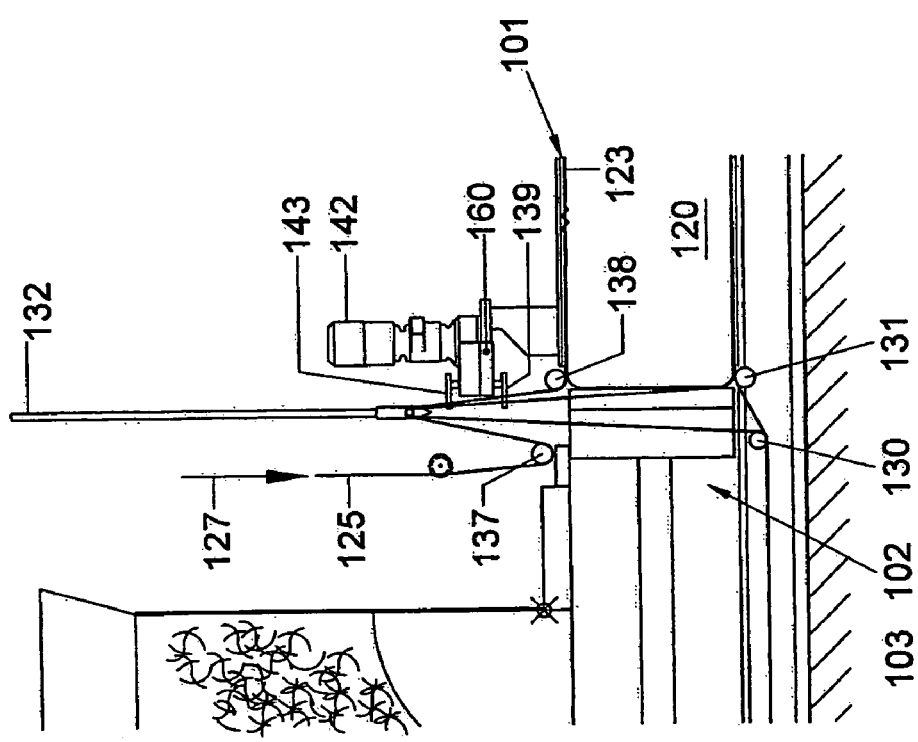

The implement for tying wire material around a bale, includes a wire guide arrangement for arranging a loop 121-123 of wire material 124, 125 around a bale 120 and for holding a pair of end portions 128, 129 (see FIG. 2A) of the loop 123 in a substantially mutually parallel orientation. According to this second example, the wire guide arrangement includes lower guide rollers 130, 131 located closely along the bottom of the pressing channel 101, for guiding lower wires 124 fed from respective spools into the pressing channel 101 and wire catchers 132 for pulling up lower wires 124 from adjacent the bottom of the baling channel 101. The wire catcher 132 is movable between a lowermost (not shown) and an uppermost position as shown in FIGS. 6, 7A and 7B. Each time after a bale is pushed out of the pressing chamber 106, the catchers 132 are lowered through slots in the pressing ram 103, catch the lower wires 24 that extend closely along the bottom of the pressing channel and pull the wires 124 up to form a temporary loop projecting until above the pressing channel 101. During upward movement, the catcher 132 also entrains the upper wires 125 into temporary loops so that the temporary loops of upper and lower wire material 124, 125 commonly extend along the catcher 132 as is shown in FIG. 7a.

The wire guide arrangement furthermore includes upper guide rollers 137, 138 at the top side end of the pressing channel 101, for guiding upper wires 125 fed from respective spools into the pressing channel 101 and to the area where the temporary loops are formed.

The implement for tying wire material around a bale, furthermore includes twisters 139 for engaging the pairs of end portions 128, 129 near the bale 120 to be tied and moving an engaged section of the at least one of each of the pairs of end portions 128, 129 about a longitudinal axis of the other one of that pair such that the pair of end portions 128, 129 are each twisted into a wire twist 140, 140' (see FIGS. 1 and 7B) between the twisters 139 and the respective portions of the loops 123 extending about the bale 120.

The implement for tying wire material around a bale, furthermore includes a second set of four twisters 143 for engaging pairs of end portions 144, 145 of the wires 124, 125 extending to the twisters 143 from the respective supply spools and for moving engaged sections of the end portions 144, 145 about longitudinal axes of the other section of that pair of end portions 144, 145, such that these end portions 144, 145 are also twisted into wire twists 146 (see FIG. 1) between the twisters 143 and more remote sections of the upper and lower wires 124, 125. These twists 146 interconnect the respective upper and lower wires 124, 125 such that when a new bale is pressed out of the pressing chamber 106, the upper and lower wires 124, 125 are pulled around the bale and form the downstream portion of the loops 123 around that bale. Previously made twists can be seen in the loops 123 around the bales 118, 119.

The twisters 139 are adapted for allowing, during twisting, wire material 124, 125 to slip through the twisters towards the portion of the loop 123 extending about the bale 120.

Also in this example, it is preferred that, the wire material slips through over such a distance that, starting from for example a situation as shown in FIG. 4, a double twist as for example shown in FIG. 5 is obtained.

Similar considerations apply to the twisting of the ends of the wires 124, 125 extending to the twisters 143 from the respective supply spools into the twists 146.

Figure 8:
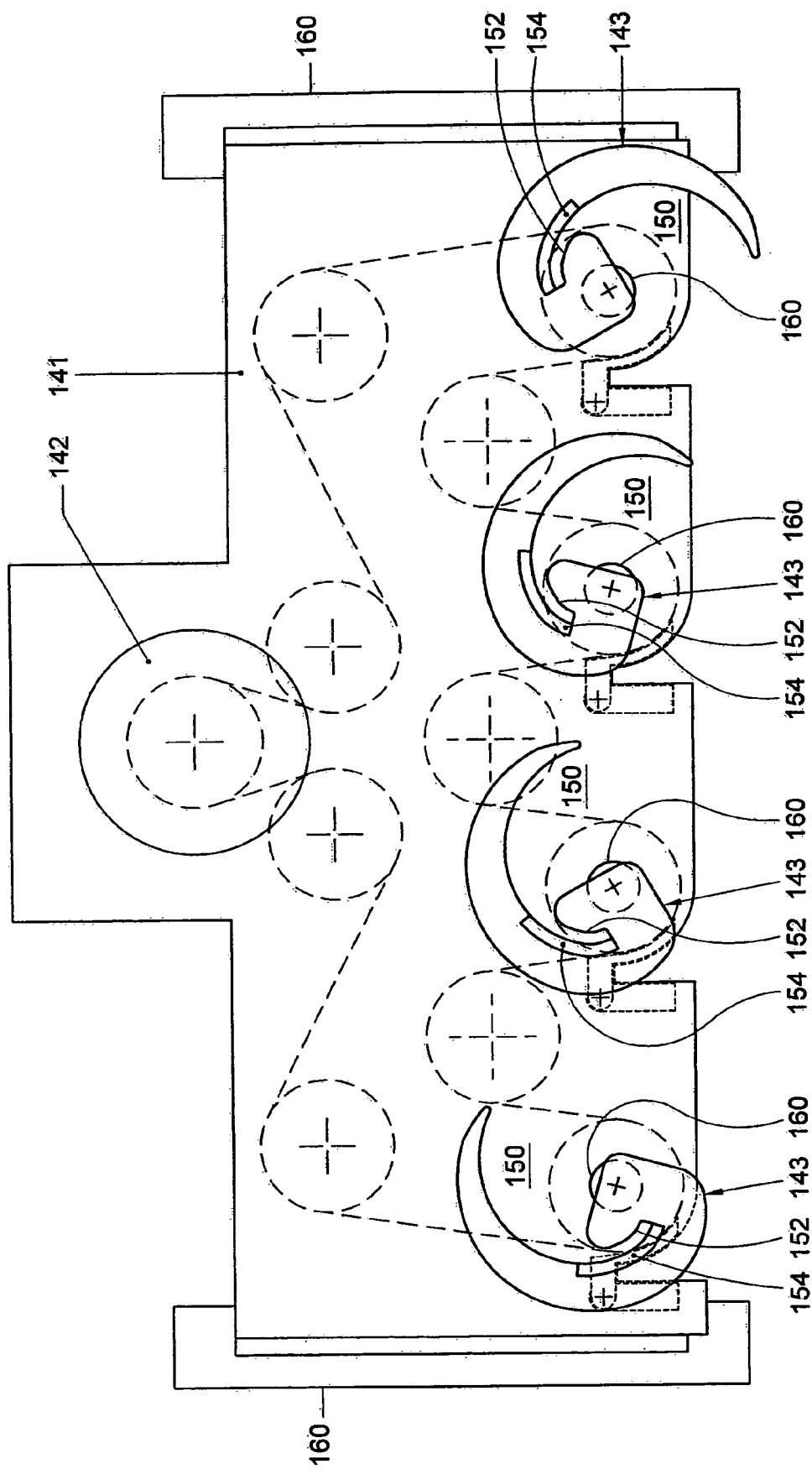
FIG. 8 is a schematic top plan view of a portion of the wire tying implement of the baling press shown in FIGS. 6, 7A and 7B.
Figure 9:
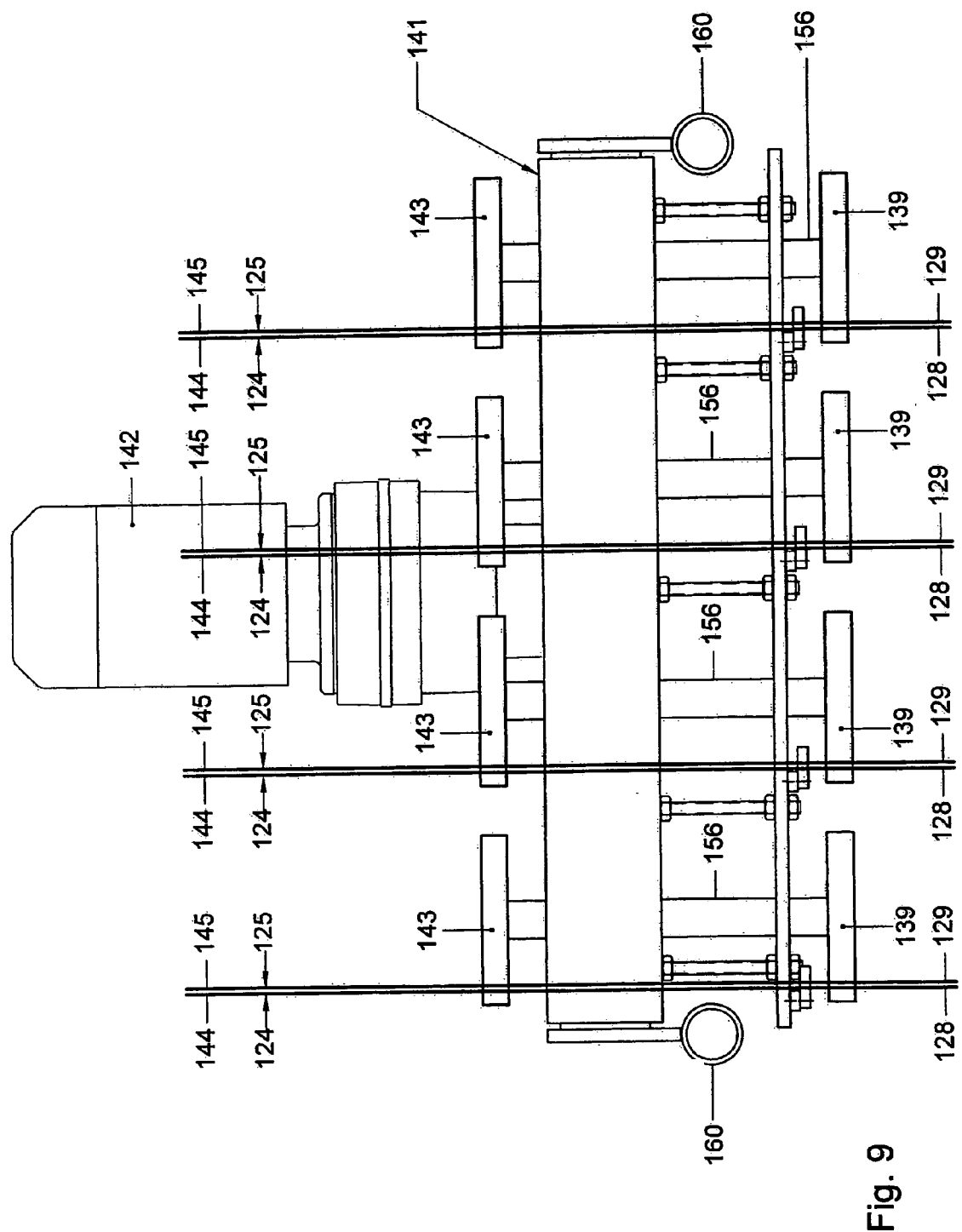
FIG. 9 is a schematic side view of a portion of the wire-tying implement of the baling press shown in FIGS. 6, 7A, 7B and 8.

The twisters 143, which are of the same design as the twisters 139, are shown in more detail in FIG. 8. The twisters 139, 143 according to the present example are each mounted to a stem 156 that is rotatably suspended in a twister carrier frame 141 and coupled to a motor 142 for driving rotation of the stems 156 and the twisters 139, 143 connected thereto. The twisters of the group of twisters 139 and the twisters of the group of twisters 143 are mounted to the stems such that the orientations of the twisters of each group are mutually staggered in rotational sense over 20-40°. The carrier frame 141 has slides 160 for allowing the frame 141 to move back and forth along guide rails (not shown). When the frame is in its retracted position, the wire catcher 132 can be moved between its lowermost and uppermost positions. Movement of the carrier frame into its forward position causes the twisters 139, 143 to engage the end portions 128, 129 and 144, 145 when rotated.

The twisters 139, 143 according to the present example are formed as twist hooks each bounding an entry area 150 for catching wires to be twisted and guiding the wires to a wire engagement passage 152 for receiving the wires 124, 125 to be twisted. Also according to the present example, the twisters 139, 143 are arranged and dimensioned to catch two end portions 128, 129 respectively 144, 145 to be twisted.

A plastic insert 154 having a surface of which the friction coefficient relative to plastic wire is relatively lower than the friction coefficient of the rest of the twister 139, 143 relative to plastic wire bounds a portion of the wire engagement passage 152.

Cutters 159 are located between the twisters 139 and the twisters 143 for cutting loose the end portion 128 and 144 respectively 129 and 145 from each other.

Also in this example, the twisters 139, 143 are rotated, for instance over one or more full revolutions, causing the end portions 128, 129, respectively 144, 145 to be twisted together slightly, before the wires 124, 125 are cut (FIG. 7B).

After cutting, the twisters are rotated further, for instance over 15-20 full revolutions, preferably until twisted pairs of wires are twisted about each other, as for example shown in FIG. 5.

The invention claimed is:

1. A method for tying wire material around a bale, comprising:
    arranging a loop of wire material around a bale;
    holding a pair of end portions of the loop in a substantially mutually parallel orientation;
    engaging the pair of end portions in an engagement area near the bale and moving by twisting an engaged section of at least one of the end portions about a longitudinal axis of the other end portion of that pair, such that the pair of end portions is twisted into a wire twist that is located between the engagement area and a portion of the loop extending about the bale; and
    during twisting, feeding wire material of at least one of the end portions to the twist being formed by arranging for the wire material of at least one of the end portions to slip through the engagement area towards the portion of the loop extending about the bale to establish a longitudinal tension in the twist that is less than a greater longitudinal tension that would exist in the twist without feeding the wire material to the twist during twisting.

2. A method according to claim 1, wherein at least one of the pair of end portions is engaged in the engagement area by a twister, wherein the moving of an engaged section of at least one of the end portions about a longitudinal axis of the other is carried out by rotating the twister and wherein the slipping occurs between the at least one engaged end portion and the twister.

3. A method according to claim 2, wherein both end portions of the at least one pair are engaged by the twister.

4. A method according to claim 1, wherein the at least one end portion is arranged to slip over such a distance that two sections of the at least one twisted pair of end portions that form the wire twist form a twisted loop in which the twisted sections of the pairs of end portions are twisted about each other.

5. A method according to claim 1, wherein the wire material has a cross-section having at least one flat or concave side.

6. A method according to claim 1, wherein at least one section of the wire material contiguous with and spaced from one of said end portions is twisted about another section of the wire material contiguous with and spaced from the other one of said end portions in a further engagement area, said contiguous sections being arranged to slip through the engagement area during twisting and being cut loose from said end portions after twisting over at least one full revolution.

7. A method according to claim 1, wherein during twisting of at least one of the end portions of the loop of wire about a longitudinal axis of the other of the end portions of the loop of wire, at least one of the end portions of the loop of wire is tensioned to substantially the same tension as the other one of the other end portions of the loop of wire.

8. A method according to claim 1, wherein the wire twist as it is formed protrudes outwardly from the loop extending about the bale.

9. A method for tying plastic wire material around a bale, comprising:
    arranging a loop of plastic wire material around a bale;
    holding a pair of end portions of the loop in a substantially mutually parallel orientation;
    engaging the pair of end portions in an engagement area near the bale and moving by twisting an engaged section of at least one of the end portions about a longitudinal axis of the other end portion of that pair, such that the pair of end portions is twisted into a wire twist that is located between the engagement area and a portion of the loop extending about the bale; and
    during twisting, feeding wire material of at least one of the end portions to the twist being formed by arranging for the wire material of at least one of the end portions to slip through the engagement area towards the portion of the loop extending about the bale to reduce longitudinal tension in the twist from a greater longitudinal tension that would result in the twist without feeding the wire material to the twist during twisting.

\* \* \* \* \*

UNITED STATES PATENT AND TRADEMARK OFFICE
CERTIFICATE OF CORRECTION

| | | |
|---|---|---|
| PATENT NO. | : 7,690,402 B2 | Page 1 of 1 |
| APPLICATION NO. | : 11/594538 | |
| DATED | : April 6, 2010 | |
| INVENTOR(S) | : Hermannus Johannes Maria Legtenberg et al. | |

It is certified that error appears in the above-identified patent and that said Letters Patent is hereby corrected as shown below:

On the title page, under Foreign Application Priority Data (30), please delete "September 11, 2005" and insert therefor --November 9, 2005--.

Signed and Sealed this

Thirtieth Day of November, 2010

David J. Kappos
*Director of the United States Patent and Trademark Office*